(12) United States Patent
Voigtlaender et al.

(10) Patent No.: US 7,764,221 B2
(45) Date of Patent: Jul. 27, 2010

(54) APPARATUS AND METHOD FOR DETERMINATION OF A DIRECTION TO AN OBJECT

(75) Inventors: Klaus Voigtlaender, Wangen (DE); Hans Irion, Winnenden (DE); Matthias Steinhauer, Steinheim (DE); Wolfgang Menzel, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 11/666,832

(22) PCT Filed: Sep. 8, 2005

(86) PCT No.: PCT/EP2005/054458

§ 371 (c)(1),
(2), (4) Date: Oct. 2, 2007

(87) PCT Pub. No.: WO2006/045668

PCT Pub. Date: May 4, 2006

(65) Prior Publication Data

US 2008/0150790 A1    Jun. 26, 2008

(30) Foreign Application Priority Data

Oct. 29, 2004    (DE) .................. 10 2004 052 518

(51) Int. Cl.
*G01S 13/00* (2006.01)
*G01S 13/08* (2006.01)

(52) U.S. Cl. .................. 342/70; 342/127; 342/147; 342/156

(58) Field of Classification Search ............. 342/70–72, 342/59, 104, 107, 109, 113, 118, 127, 139, 342/147; 701/1–302

See application file for complete search history.

(56) References Cited

U.S. PATENT DOCUMENTS

| 3,600,690 | A | * | 8/1971 | White .......................... 327/12 |
| 4,310,852 | A | * | 1/1982 | Tricoles ...................... 348/162 |
| 4,703,429 | A | * | 10/1987 | Sakata ......................... 701/96 |
| 4,717,916 | A | * | 1/1988 | Adams et al. ............... 342/107 |
| 4,818,999 | A | * | 4/1989 | Kobayashi et al. ............ 342/59 |
| 5,654,715 | A | * | 8/1997 | Hayashikura et al. ......... 342/70 |
| 5,839,096 | A | * | 11/1998 | Lyons et al. ................. 702/183 |
| 5,872,536 | A | * | 2/1999 | Lyons et al. .................. 342/70 |
| 6,031,483 | A | * | 2/2000 | Urabe et al. .................. 342/70 |
| 6,232,910 | B1 | * | 5/2001 | Bell et al. ..................... 342/70 |
| 6,246,359 | B1 | * | 6/2001 | Asano et al. ................ 342/158 |
| 6,275,180 | B1 | * | 8/2001 | Dean et al. .................... 342/70 |
| 6,462,700 | B1 |   | 10/2002 | Schmidt et al. |

(Continued)

*Primary Examiner*—Thomas H Tracza
*Assistant Examiner*—Peter M Bythrow
(74) *Attorney, Agent, or Firm*—Kenyon & Kenyon LLP

(57) ABSTRACT

An apparatus includes a plurality of sensor modules that are disposed at spacings with respect to one another, each sensor module having a local oscillator device. The oscillator device generates an oscillator signal that is passed on to a transmit/receive device, and the oscillator signal is radiated. The transmit/receive device is set up such that it can receive signals reflected from the object. A phase detection device is coupled at one input to the oscillator device and at a second input to the transmit/receive device. Based on the oscillator signal and the received reflected signals, the phase detection device determines a phase signal. A control and signal-processing device determines, based on the spacings of the sensor modules with respect to one another and the phase signals, a direction of the object with respect to the sensor module.

14 Claims, 7 Drawing Sheets

U.S. PATENT DOCUMENTS

| | | |
|---|---|---|
| 6,614,388 B2 * | 9/2003 | Klinnert et al. ................ 342/70 |
| 6,690,616 B1 | 2/2004 | Bahr et al. |
| 6,750,810 B2 * | 6/2004 | Shinoda et al. ............. 342/149 |
| 7,019,685 B2 * | 3/2006 | Suzuki et al. ................. 342/70 |
| 7,151,482 B2 * | 12/2006 | Natsume et al. ............. 342/147 |
| 2002/0075178 A1 | 6/2002 | Woodington et al. |
| 2002/0147534 A1 * | 10/2002 | Delcheccolo et al. ......... 701/45 |
| 2005/0179586 A1 * | 8/2005 | Klinnert et al. ............. 342/137 |

* cited by examiner

APPARATUS AND METHOD FOR DETERMINATION OF A DIRECTION TO AN OBJECT

FIELD OF THE INVENTION

The present invention relates to an apparatus for determining a direction to an object, and to a method for directional determination using the apparatus.

Although example embodiments of the present invention are described with reference to radar systems in vehicles, the present invention is not limited thereto.

BACKGROUND INFORMATION

U.S. Patent Application Publication No. 2002/0147534 describes an object sensing system having a plurality of FCWM sensors that determine the position of the object by triangulation. The same thing is described in U.S. Pat. No. 5,872,536. PCT International Published Patent Application No. WO 00/08484 describes a parking aid having a plurality of ultrasonic distance sensors. The latter are operated at different transmitting frequencies and are equipped with bandpass filters to prevent superimposition of the signals.

U.S. Patent Application Publication No. 2002/0075178 describes an FCWM radar transmitter having a local voltage-controlled oscillator. An emitted radar signal is modified as to its frequency, and the beat between a back-reflected and an emitted signal is sensed and is evaluated as the transit time of the reflected signal. The article "A 24-GHz Short Range Radar Network for Automotive Applications" by Michael Klotz and Hermann Rohling, which appeared in 2001 in CIE International Conference on Proceedings from 15 to 18 October, describes a pulsed radar technology for controlling a vehicle in road traffic.

The article "Waveform Design Principles for Automotive Radar Systems" by Rohling et al., CIE International Conference on Proceedings on Oct. 15-18, 2001, Piscataway, N.J., USA, describes a 77-GHz FMCW radar sensor for automobile applications.

PCT International Publication Patent Application No. WO 01/26183 describes an asymmetrical multi-beam radar sensor having an angle evaluation system that has polyrods.

Increasing the safety and convenience of vehicles is one of the primary goals of the automobile industry. One possibility for enhancing the safety of a vehicle involves automatically detecting road traffic obstacles. This requires a determination of the vehicle's distance from a possible obstacle, as well as a determination of the direction in which the obstacle is located. The direction to the obstacle must be determined, inter alia, in order to distinguish between obstacles that are located on the road or at the side of the road.

One possibility for enhancing vehicle convenience involves determining the speed of a preceding vehicle in heavy traffic, and automatically adapting the speed of the own vehicle. This means that it must be possible to determine the distance to the preceding vehicle, its speed, and whether that vehicle is located in the same lane, or at an offset from the own vehicle in a second lane. These are two possible uses for a radar system in the vehicle sector; another might include, among others, a parking aid. All these methods require an apparatus that allows the distance and direction of an object with respect to the vehicle to be determined.

In a conventional method, a primary source for microwaves is made available, the emission of which source is collimated with the aid of a suitable optical system into a beam having a half-power width of 3-4°; and then, by a deflecting optical system, forms three to four beams therefrom which together cover a relatively narrow angle range of 8 to 16°. For each individual one of these beams, the portions reflected from an object are separately sensed with a sensing device. An amplitude comparison of the reflected portions for the individual beams makes possible a determination of the direction in which the object is located. The achievable angular resolution, as well as the angle range covered, are disadvantageously defined by the mechanical configuration, and thus limit the field of application of the sensor.

A further method provides for determining, from the phase of the reflected beams, the geometrical placement of the object with respect to a sensor assemblage. A sensor assemblage provides for a suitable transmitting device to illuminate the entire desired observation region, and a plurality of receiving devices sense the signals reflected from the object. The receiving devices determine the phase of the individual reflected signals, and a signal processing device calculates, on the basis of those phase signals, the different path lengths that the reflected signals have traveled, and thus the geometrical placement of the object with respect to the vehicle. A disadvantage of this assemblage is that a high output power is required for the transmitting device, since part of the transmitted signal must be made available, for all receiving directions, for a receiving mixer, and large losses in the requisite distributor networks occur because of the strong damping in the frequencies used, in the region of 76-81, 122-123, or 126-150 GHz (or even higher).

A further sensor assemblage provides for the use of only one receiver device, and for the latter to be connected, sequentially in time, to a plurality of antenna devices. The disadvantage of this apparatus is that the duration of a measurement using all the antenna devices is too long, because of the multiplexing method, to allow this apparatus to be used for dynamic situations in road traffic.

A further sensor assemblage provides for combining the receiving device with the receiving device, and for connecting them, successively in time, to a plurality of antenna devices. This apparatus likewise has the disadvantage of too long a measurement time.

SUMMARY

Example embodiments of the present invention provide an apparatus and a method that make possible short measurement times, that exhibit low power losses, and that dispense with one of the transmitting and receiving devices at the high-frequency level (77/122/140 GHz; see above).

An underlying goal is disposing a plurality of sensor modules at spacings with respect to one another, each sensor module having a local oscillator device. The oscillator device generates an oscillator signal that is passed on to a transmit/receive device, and the oscillator signal is radiated. The transmit/receive device is arranged such that it can receive signals reflected from the object. A phase detection device is coupled at one input to the oscillator device and at a second input to the transmit/receive device. Based on the oscillator signal and the received reflected signals, the phase detection device determines a phase signal. A control and signal-processing device determines, based on the spacings of the sensor modules with respect to one another and the phase signals, a direction of the object with respect to the sensor module.

Each sensor module has a separate local oscillator device. A distribution device for distributing the microwave signal from a central oscillator device to the individual sensor modules is therefore not required, and losses in the apparatus are thus kept low.

The method for a determination of distance for an object, using the apparatus described herein, provides for at least one of the transmit/receive devices of the sensor modules to transmit the oscillator signal. The beams reflected from the object are received, by the transmit/receive device, from a direction of the object. Based on the received reflected signals and the oscillator signal, a phase signal is determined which in turn is the basis for determining, by the control and signal-processing device, the direction of the object with respect to a sensor module.

The spacings of the sensor modules with respect to one another may be equidistant or, the spacings may be of different magnitudes. Equidistant spacings have the advantage that a high signal-to-noise ratio is achievable. An assemblage having spacings of different magnitudes, on the other hand, has the advantage that the number of ambiguities for directional determination can thereby be reduced.

A collimation device made up of a lens and/or a dielectric polyrod may be disposed in the radiation direction of one of the sensor modules. These collimation devices allow a signal increase in the transmitted oscillator signals, and in the received reflected signals, in or from desired directions.

A quasi-optical filter may be disposed in the radiation direction of one of the sensor modules, thereby allowing a suppression of ambiguities from certain directions to be achieved.

The phase detection device may have a controllable filter device having an adjustable filter characteristic. A further refinement provides for at least one of the sensor modules to have a controllable oscillator device having an adjustable oscillator frequency. A further refinement provides for the control and processing device to be connected to at least one of the sensor modules in order to adjust, with control signals, the filter device and/or the oscillator frequency of the sensor module. This allows the oscillator frequencies of the individual sensor modules to be adjusted to separate frequencies, and permits a determination, via the filter characteristics, of only those phase signals whose associated reflected signals are emitted from a specific sensor module. It is of particular interest in this context that the individual sensor modules transmit at different frequencies, and take into account in the phase signals only those reflected signals that have the same frequency as the oscillator signal of the respective sensor module. A multiplexing method in the frequency region can thereby be implemented.

According to a further refinement, the phase detection device has a mixer for demixing the received reflected signal.

According to a further refinement, the phase detection device is set up such that the phase signal is determinable by direct sampling of the received reflected signal.

According to a further refinement, at least two oscillator devices are not synchronized with one another.

According to a further refinement, a synchronization device is provided with which at least two oscillator devices are synchronizable. In addition, the oscillator devices can have a phase-lock loop. This makes it possible to synchronize the oscillator device with one another with the aid of a low-frequency signal.

According to a further refinement, the sensor modules are disposed along a line or in planar fashion.

According to a further refinement, the oscillator signals of two sensor modules are adjusted, by the control and signal-processing device, such that they exhibit different oscillator frequencies.

According to a further refinement, the control and signal-processing device modifies the oscillator frequency of the oscillator module over time in accordance with a frequency ramp.

According to a further refinement, the oscillator frequency of the oscillator modules is modified in accordance with the same frequency ramp after a time offset, the time offset being different for the individual sensor modules. The individual oscillator frequencies of the sensor modules are thus different at every point in time. At the same time, the frequency ramp makes possible a frequency-modulated continuous wave (FMCW) method for determining the distance of the object with respect to the sensors.

According to a further refinement, a filter characteristic of a filter device of the phase detection device of at least one of the sensor modules is adjusted such that the phase detection device determines only phase signals that are based on the signals radiated by that sensor module. This makes possible parallel operation of the sensor modules with high angular resolution.

According to a further refinement, the phase detective device senses only phase signals that are based on signals radiated from a second sensor module. This results in a lower angular resolution as compared with the refinement recited above, but also in fewer problems with ambiguities from different directions.

Exemplary embodiments of the present invention, as well as refinements, are depicted in the Figures of the drawings and explained in more detail in the description that follows.

DETAILED DESCRIPTION

Figure 1:
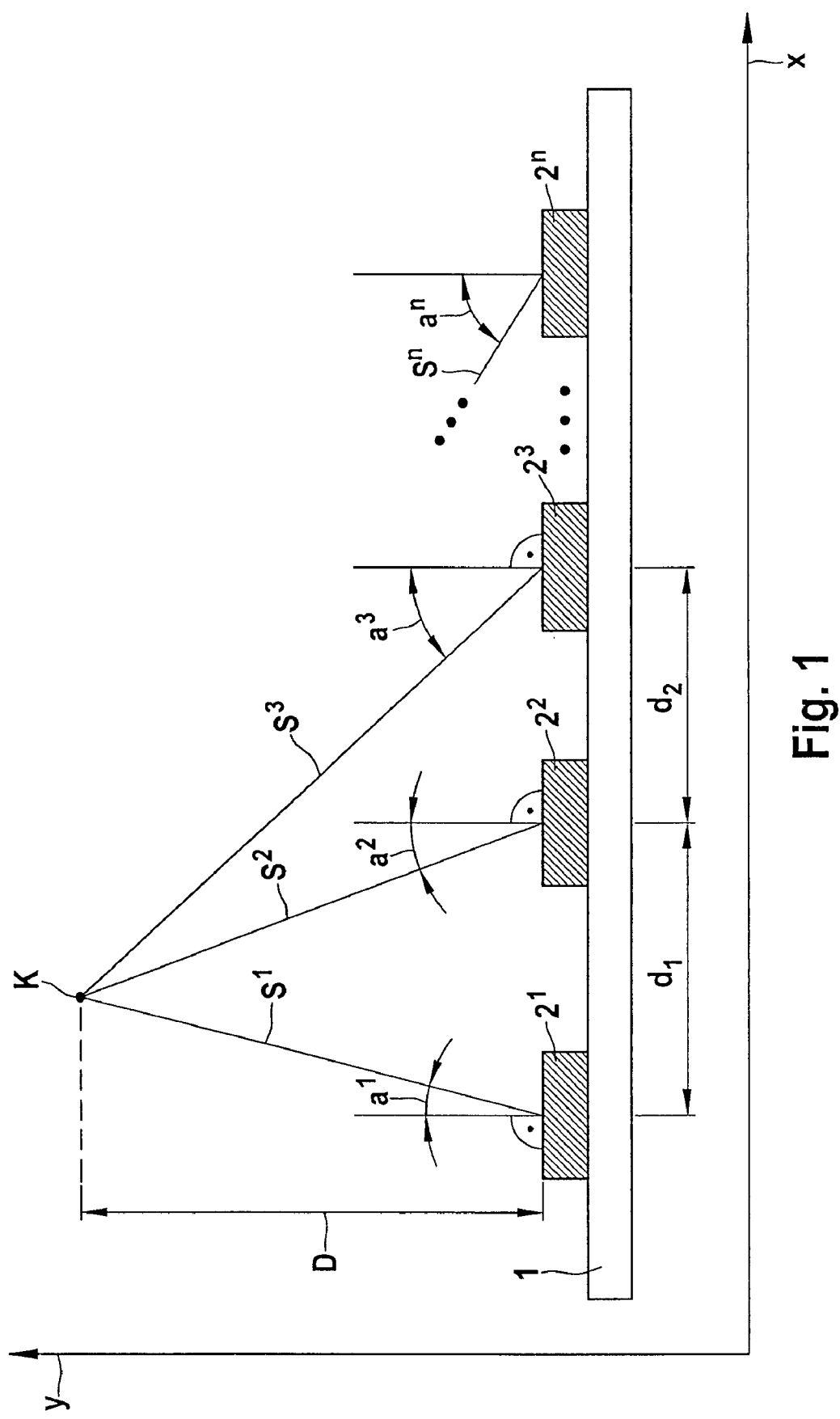
FIG. 1 schematically depicts an example embodiment of the present invention.

In the Figures, identical reference characters designate identical or functionally identical components, provided nothing to the contrary is indicated.

FIG. 1 is a schematic depiction of an example embodiment of the present invention, in a side view. A plurality of sensor modules $2^1, 2^2, 2^3, 2^n$ are disposed on a carrier 1. This carrier 1 can, for example, be mounted on a surface on a front side of a vehicle. In the embodiment depicted, sensor modules $2^1, 2^2, 2^3, 2^n$ are disposed along a spatial direction x at spacings $d_1, d_2$. Spacings $d_1, d_2$ can be in the range from 1 mm to 4 cm. An object K is located, in a spatial direction y orthogonal to direction x, for example in the direction of travel of the vehicle, at an object distance D with respect to sensor modules $2^1, 2^2, 2^3, 2^n$. Travel pathways $2^1, 2^2, 2^3, 2^n$ between transmitting modules $2^1, 2^2, 2^3, 2^n$ and object K are generally of different lengths. Travel pathways $S^1, S^2, S^3, S^n$ extend with respect to direction y at angles $a^1, a^2, a^3, a^n$ that likewise differ. The result is that from geometrical considerations, angles $a^1, a^2, a^3, a''$ can be unequivocally determined from the lengths of travel pathways $S^1, S^2, S^3, S''$ and from spacings $d_1$, $d_2$. Angles $a^1, a^2, a^3$, an are hereinafter also referred to as the direction of object K with respect to sensor modules $S^1, S^2$, $S^3, S''$.

In the example embodiment described, each sensor module $2^1, 2^2, 2^3, 2''$ transmits an oscillator signal having an oscillator frequency. These oscillator signals are in part reflected from object K back to sensor modules $2^1, 2^2, 2^3, 2''$. Sensor module $2^1, 2^2, 2^3, 2''$ are set up such that they can determine the phase difference of the reflected signal with respect to the oscillator signal. Each transmitting module $2^1, 2^2, 2^3, 2''$ takes into account only the respective reflected signal that proceeds from one of these transmitting modules $2^1, 2^2, 2^3, 2''$. The phase differences determined by sensor modules $2^1, 2^2, 2^3, 2''$ are dependent on the lengths of travel pathways $S^1, S^2, S^3, S''$ between sensor modules $2^1, 2^2, 2^3, 2''$ and object K. The phase differences are delivered, as phase signals, to a signal processing system that, based on the differences of the phase signals, can determine the length differences of travel pathways $S^1, S^2, S^3, S''$ and the angles $a^1, a^2, a^3, a''$. A relative phase datum for the individual oscillator signals of the various sensor modules $2^1, 2^2, 2^3, 2''$ with respect to one another is not required; only the phase difference of the respective oscillator signal with respect to the reflected signal needs to be determined by the respective sensor modules. The angles can be determined with the aid of a Fourier transform and/or adaptive methods such as, for example, so-called minimum variance beam forming. Corresponding methods are used for radar and sonar systems.

In the determination of object K and of direction $a^1, a^2, a^3$, $a''$ of object K, ambiguities occur that depend, inter alia, on spacings $d_1, d_2$. In the context of an equidistant placement of sensor modules $2^1, 2^2, 2^3, 2''$ at a spacing $d_1, d_2$ of one wavelength of the oscillator signal, an ambiguity occurs for an angle $a^1, a^2, a^3, a''$ and the angles that are 30° or smaller than angles $a^1, a^2, a^3, a''$. With an increasing spacing $d_1, d_2$ of sensor modules $2^1, 2^2, 2^3, 2''$, the angle range in which an ambiguity occurs becomes smaller, and more ambiguities accordingly occur within the observed angle range. Spacings $d_1, d_2$ lie in the range from /2 to 5, where indicates the wavelength of the oscillator signal.

The ambiguities are reduced in the context of a placement of sensor modules $2^1, 2^2, 2^3, 2''$ at spacings of different magnitudes. With this placement, however, a greater overlap occurs of the reflected signals from objects that exhibit the same distance and speed and differ only in terms of angle. Weaker objects can thereby masked by stronger objects.

The oscillator frequencies of the individual sensor modules $2^1, 2^2, 2^3, 2''$ can be different. In an example embodiment, they are at least selected to be different for each point in time. This makes possible an allocation of the reflected signals to the individual sensor modules $2^1, 2^2, 2^3, 2''$. Alternatively, a time multiplexing method can also be used in which sensor modules $2^1, 2^2, 2^3, 2''$ transmit an oscillator signal, and receive the reflected signals, with a time offset from one another. Also possible is a combination of the two multiplexing methods, in order on the one hand to utilize the advantage of parallel transmission and reception with the aid of the frequency multiplexing method, and on the other hand to require only a limited number of transmitting frequencies.

A further example embodiment of the present invention provides that not all sensor modules $2^1, 2^2, 2^3, 2''$ transmit an oscillator signal. For example, only sensor module $2^1$ transmits an oscillator signal, and the reflected portions of the oscillator signal are received by sensor modules $2^1, 2^2, 2^3, 2''$. The phase difference, with respect to an oscillator signal of sensor module $2^2$, of the reflected signal that sensor module $2^2$ receives is defined in that the oscillator signal of sensor module $2^2$ is synchronized with the oscillator signal of sensor module $2^1$. The phase differences thus determined are transferred by sensor modules $2^1, 2^2, 2^3, 2''$, as phase signals, to a signal processing device, and on the basis of the differences of the phase signals, the lengths of travel pathways $S^1, S^2, S^3, S''$, and angles $a^1, a^2, a^3, a''$, are determined. An advantage of a single transmitter is that neither a frequency multiplexing method nor a time multiplexing method is required. In the context of two or more transmitting sensor modules $2^1, 2^2, 2^3$, $2''$, corresponding multiplexing methods need to be used.

In the example embodiment described above, sensor modules $2^1, 2^2, 2^3, 2''$ are set up so that they do not all transmit an oscillator signal. A second possibility for achieving only a single quasi-active is to set the oscillator frequency of transmitting module $2^1$ to a first oscillator frequency, and to set oscillator frequencies of the other sensor modules $2^1, 2^2, 2^3$, $2''$ to another, or to several other, oscillator frequencies. A filter device must be provided in sensor modules $2^1, 2^2, 2^3, 2''$ that allows only phase signals having the first oscillation frequency of sensor module $2^1$ to base. The phase signals that are based on the oscillator signals of the second sensor module $2^1, 2^2, 2^3, 2''$ are thereby suppressed.

Figure 2:
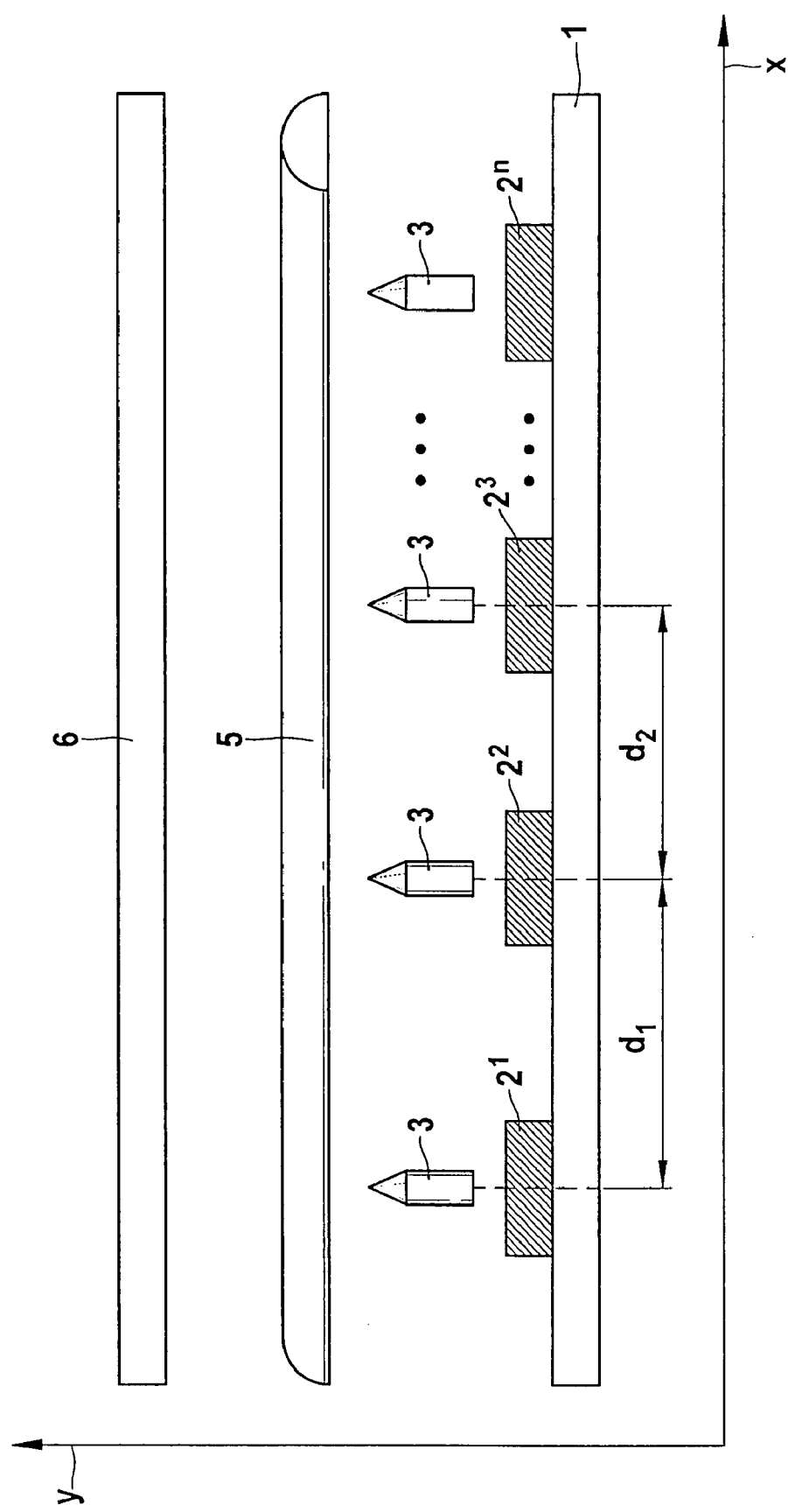
FIG. 2 is a schematic side view of an example embodiment of the present invention.

FIG. 2 is a schematic side view of an example embodiment of the present invention. A plurality of sensor modules $2^1, 2^2$, $2^3, 2''$ are disposed, spaced apart at spacings $d_1, d_2$, on a carrier 1 that can be mounted on a vehicle. Optionally, dielectric polyrods can be disposed above sensor modules $2^1, 2^2, 2^3, 2''$. Polyrod 3 are tapered dielectric rods that can be used as a collimation device. A polyrod 3 having a length of $3\lambda$ can restrict the transmitting and receiving angle of the sensor module to approximately +/−20°. Ambiguities in angle determination can thereby be reduced if ambiguities occur only at angles that are greater than +/−20°. For that purpose, the signal processing device must be provided with corresponding calculation routines that take into account only angles within the transmitting and receiving angle. By an optical lens 5, for example a cylindrical lens, the signal intensity is elevated in a desired angle range, thus allowing an improvement in the signal-to-noise ratio. A further suppression of ambiguities can be achieved by a so-called quasi-optical filter 6. This quasi-optical filter 6 is made up of multiple dielectric layers that are disposed one above another in direction y. Quasi-optical filter 6 has a transmission characteristic that depends on the frequency of the signal, and on the angle of incidence of the signal onto quasi-optical filter 6. The latter is used in order to allow signals having an oscillation frequency from one direction to be transmitted, and those from other directions to be suppressed. The information about the filter characteristic is conveyed to the signal processing system in order to suppress the ambiguities.

Figure 3:
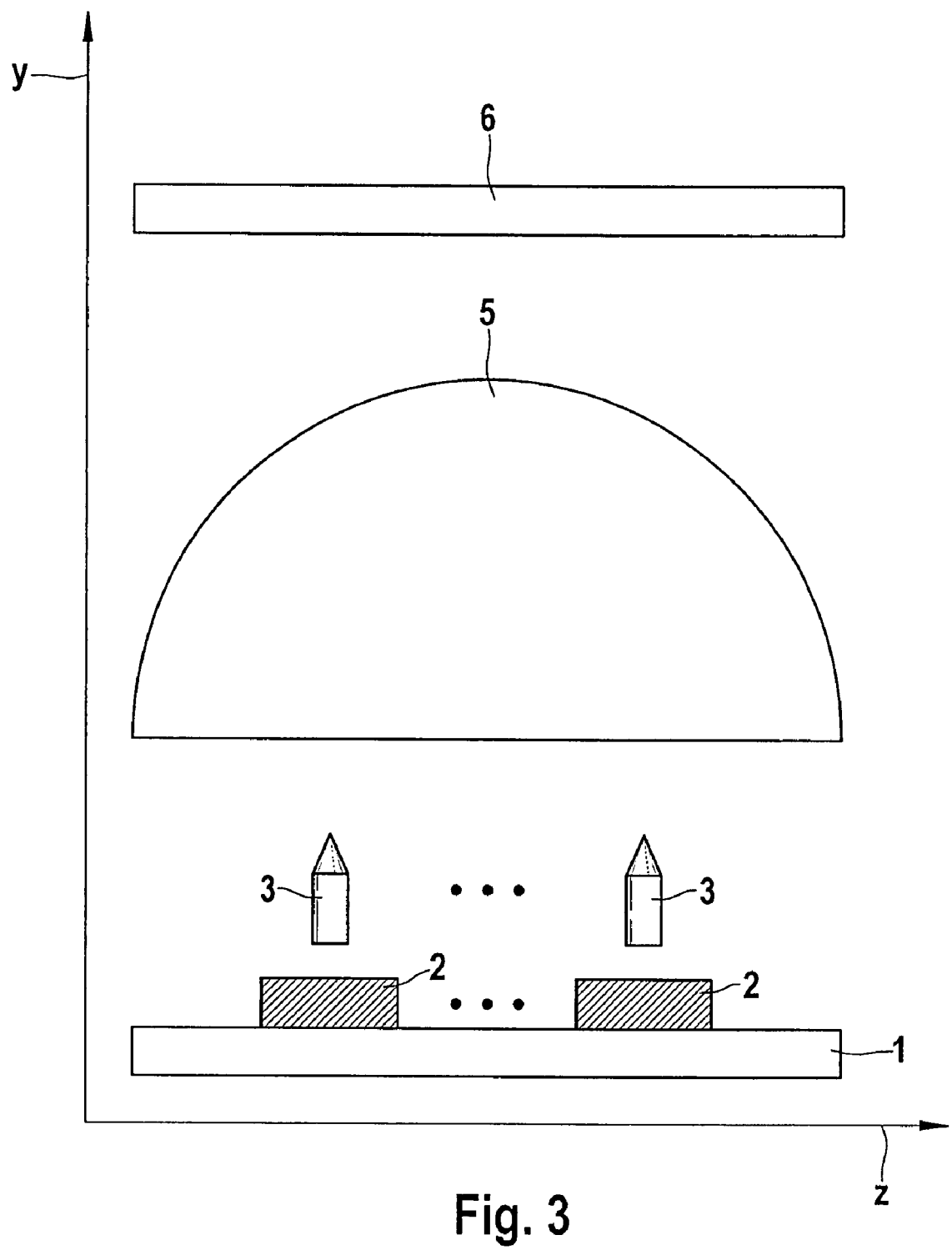
FIG. 3 is a second schematic side view of the exemplary embodiment from a second orthogonal direction.

FIG. 3 is a side view of the aforementioned example embodiment from a second spatial direction. Sensor modules $2^1, 2^2, 2^3, 2''$ can be disposed in one or in several rows. Sensor modules $2^1, 2^2, 2^3, 2''$ can be individual integrated components, or can be manufactured together in integrated fashion on carrier 1.

Figure 4A:
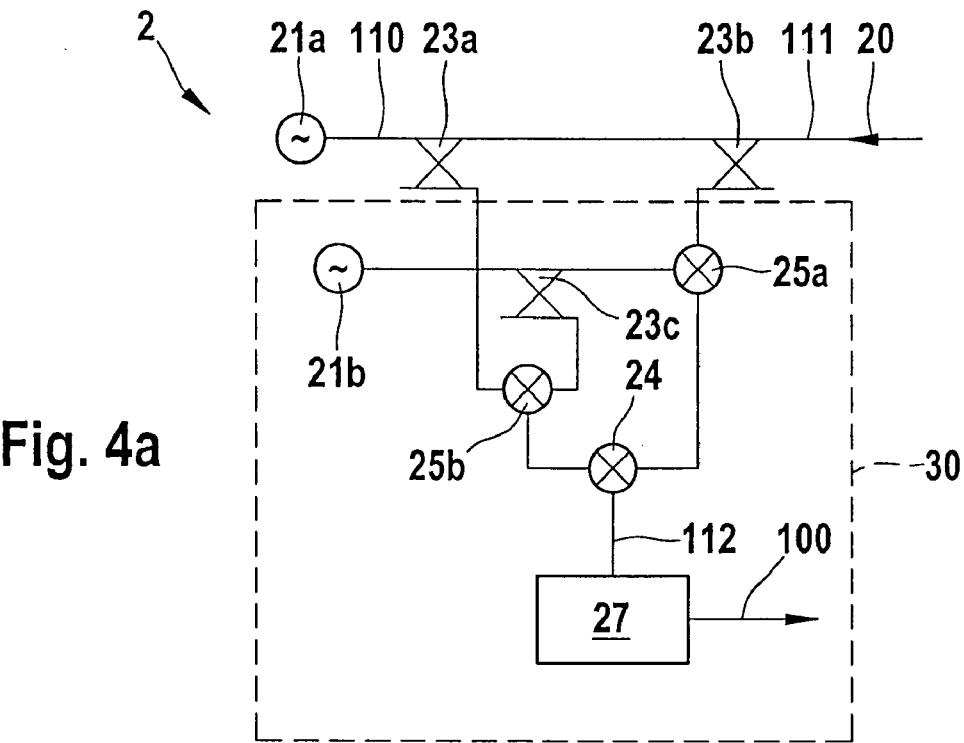
FIGS. 4*a* to 4*d* schematically depict four example embodiments of a sensor module.
Figure 4B:
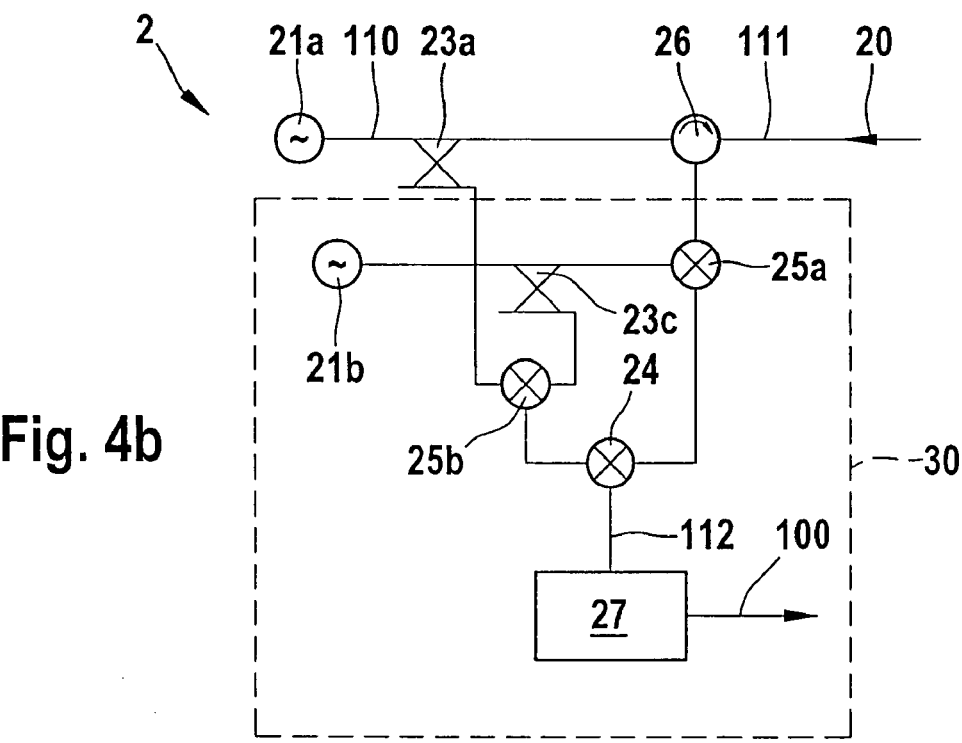

FIGS. 4a to 4d depict four example embodiments of a sensor module 2. FIGS. 4a and 4b each show heterodyne detection, and 4c and 4d each show homodyne detection. FIG. 4a depicts a local oscillator 21a that is connected to a transmitting device 20. Local oscillator 21a generates an oscillator signal having a frequency in the range from 76-81 GHz, 122-123 GHz (see above), or 126-145 GHz. Local oscillator 21 can be set up so that its oscillation frequency is adjustable. In addition, local oscillator 21a can have a phase-lock loop that makes possible synchronization of the oscillator signal with a low-frequency delivered signal. The oscillator device is connected via a path to a transmit/receive device 20. Transmit/receive device 20 has an antenna device. The transmit/receive device can be enabled, and then transmits oscillator signal 110 via the antenna device. A reflected signal 111 can be received by the transmit/receive device. By a coupling device 23a on local oscillator 21a and a coupling device 23b that is disposed in the vicinity of the transmit/receive device, oscillator signal 110 and reflective signal 111 are delivered to a phase detection device 30. In FIG. 4a, phase detection device 30 has a second local oscillator 21b whose oscillator signal is mixed, with the aid of two mixers 25a and 25b, into oscillator signal 110 of local oscillator 21a and into reflected signal 111. The two signals mixed in this fashion are delivered to a third mixer 24, and reflected signal 111 is thus demixed from the oscillator signal. Mixer 24 can be a push-pull mixer. Demixed signal 112 contains a phase signal 100 that is dependent on the phase different between oscillator signal 110 and the reflected signal. A filter device 27 is placed downstream from mixer 24 in order to filter out higher-frequency portions of demixed signal 112. Filter device 27 can have an adjustable filter characteristic. The filter characteristic of filter 27 is set such that only reflected signals 111 in phase signal 100 that exhibit almost the same frequency as the oscillator signal are taken into account. In the context of a frequency multiplexing method, sensor module 2 thus determines only phase signals 100 that correspond to oscillator signal 110 transmitted by it. To ensure that reflected signals 111 in phase signal 100 that exhibit a modified frequency with respect to oscillator signal 110 because of a Doppler shift are taken into account, the filter characteristic of filter 27 can have a correspondingly wide filter band. In another method, the filter characteristic is set so that only reflected signals 111 in the phase signal that exhibit the same frequency as the oscillator signal of a primary or central sensor module $2^1$ are taken into account.

In FIG. 4b, coupling device 24b is replaced by a circulator device 26.

Figure 4C:
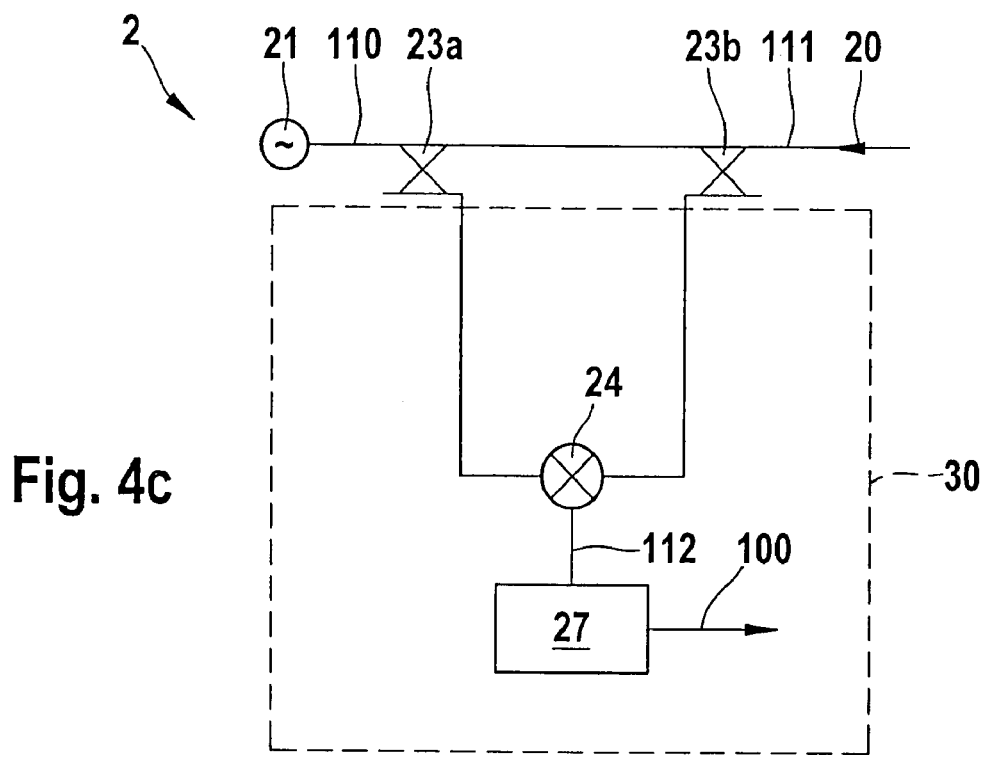
Figure 4D:
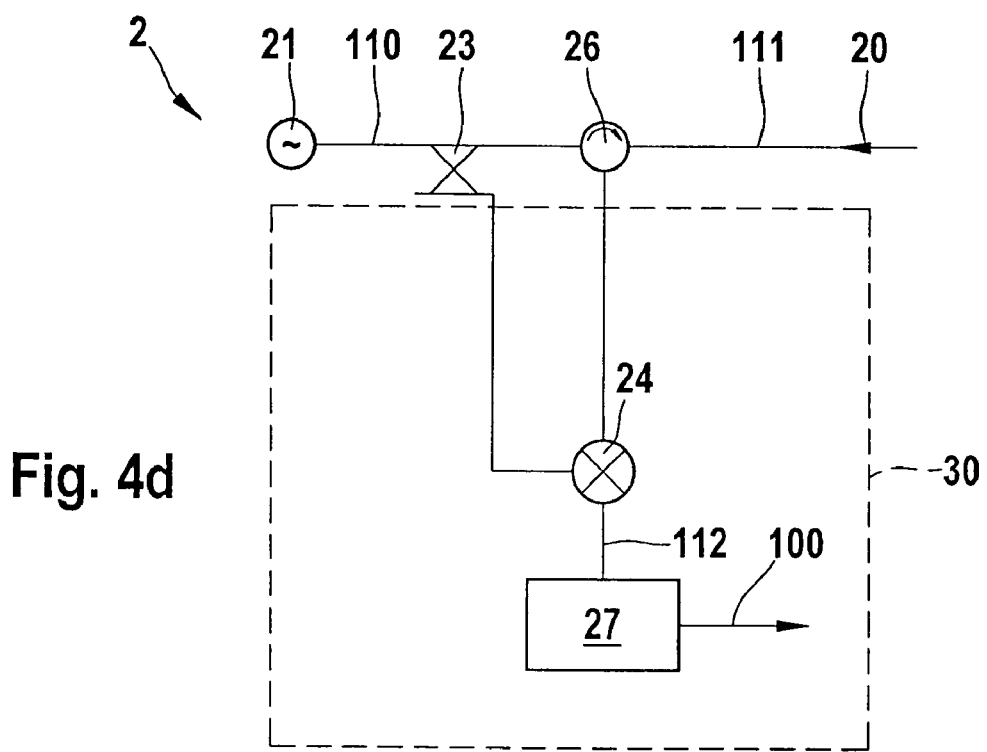

FIGS. 4c and 4d show a homodyne detection device. In both cases, phase detection device 30 has only one mixing device 24. Portions of oscillator signal 110 and of reflected signal 111 are delivered to mixing device 24 via two coupling devices 23a and 23b. Signal 112 demixed by mixing device 24 are, as previously, delivered to a filter device 27 in order to determine phase signal 100. In FIG. 4d, coupling device 23b is replaced by a circulator device 26.

Figure 5:
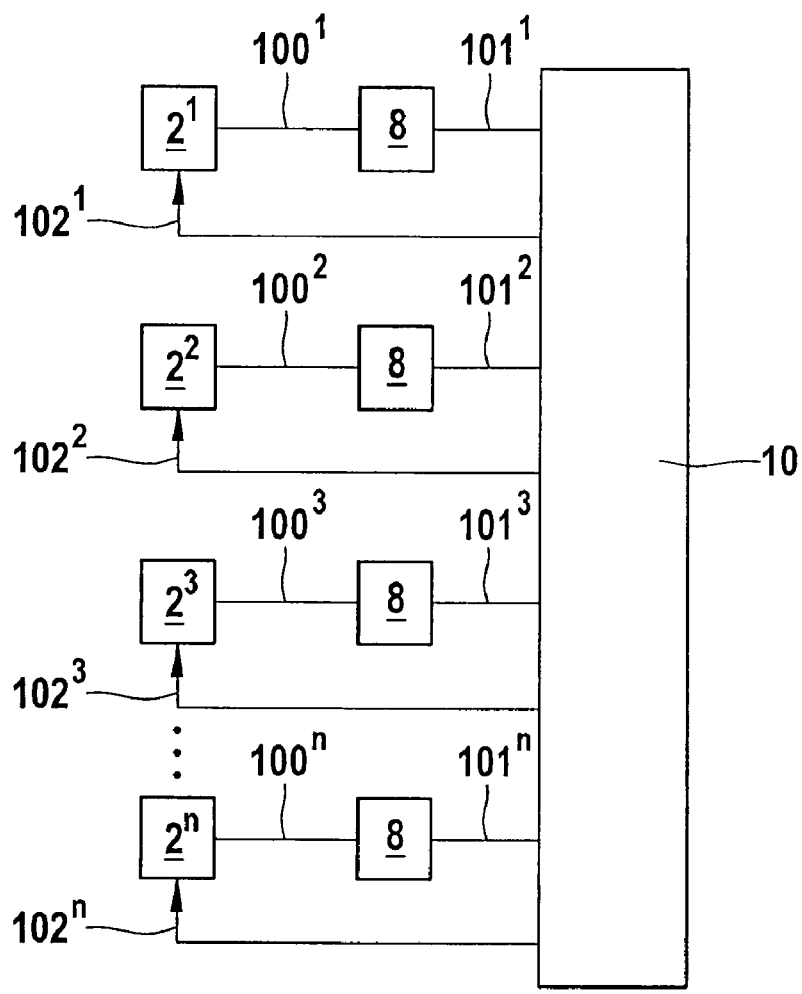
FIG. 5 schematically depicts an interconnection of an example embodiment.

FIG. 5 schematically depicts the signal management in an example embodiment of the present invention. Sensor modules $2^1$, $2^2$, $2^3$, $2^n$ each output their phase signals $100^1$, $100^2$, $100^3$, $100^n$. Phase signals $100^1$, $100^2$, $100^3$, $100^n$ are correspondingly determined and outputted in parallel fashion in the context of the above-described frequency multiplexing method, or successively in the context of a time multiplexing method. Phase signals $100^1$, $100^2$, $100^3$, loon are delivered to a conversion device 8. Conversion device 8 has an analog/digital converter. The digitized phase signals are delivered to a signal-processing and control device 10. This signal-processing and control device 10 determines, based on the digitized phase signals $100^1$, $100^2$, $100^3$, loon, the lengths of travel pathways $S^1$, $S^2$, $S^3$, $S^n$ and angles $a^1$, $a^2$, $a^3$, $a^n$. In addition, the signal-processing and control device can modify, via control signals $102^1$, $102^2$, $102^3$, $102^n$ the oscillator frequencies of the individual sensor modules $2^1$, $2^2$, $2^3$, $2^n$ and the filter characteristics of the sensor modules. Control signals can moreover be provided which enable transmit/receive module 20 so that transmit/receive devices 20 transmit oscillator signal 110.

Figure 6:
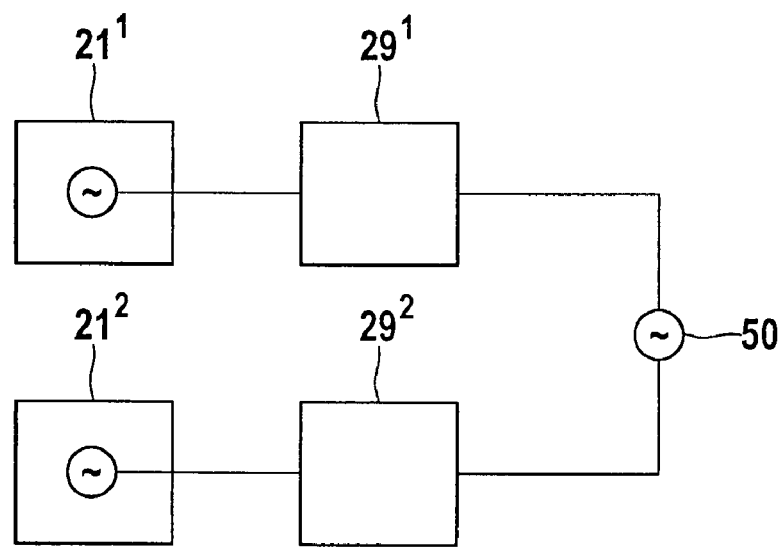
FIG. 6 schematically depicts a synchronization of two oscillator devices.

FIG. 6 is a schematic depiction of a synchronization of two oscillator devices. An oscillator device $2^1$ of a first sensor module $2^1$ is connected to a first phase-lock loop $29^1$. Analogously, an oscillator device $21^2$ is connected to a second phase-lock loop $29^2$. Phase-lock loops $29^1$ and $29^2$ are connected to a low-frequency oscillator device 50. The latter generates an oscillator signal that can be distributed with low losses. By means of the two phase-lock loops $29^1$ and $29^2$, a fixed-phase linkage of the oscillator signals of the two oscillator devices $21^1$ and $21^2$ to low-frequency oscillator device 50 is achieved. An advantage, as compared with a distribution of the high-frequency oscillator signal (having oscillator frequency w) by a central oscillator device, lies in the lower losses.

In the exemplary embodiments described, it is mentioned that a decoupling of sensor modules $2^1$, $2^2$, $2^3$, $2^n$ in the context of multiple enabled transmit/receive devices 2 is used, and that this can be achieved using a frequency multiplexing method. An advantage of the frequency multiplexing method is that transmit/receive devices 2 can be operated simultaneously. In the context of a frequency difference between the oscillator frequencies of two oscillator signals 110 with an identical signal pathway $S^1$, $S^2$, $S^3$, $S^n$, however, different phase differences result. The signal processing device erroneously interprets this as an angle between signal pathways $S^1$, $S^2$, $S^3$, $S^n$. Because the phase difference is proportional to the product of the oscillator frequency and the length of signal pathway $S^1$, $S^2$, $S^3$, $S^n$, the errors in angle determination get larger with increasing oscillator frequency and increasing distance of object K. If the oscillator frequencies are known, a correction of the erroneously determined angle is possible if the distances can be determined with increased accuracy. The effort necessary for this is, however, considerable.

Figure 7:
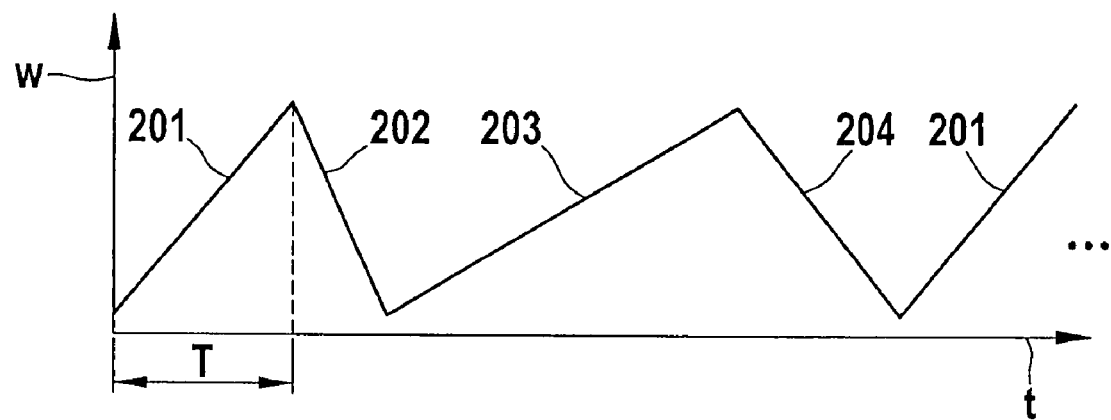
FIG. 7 schematically depicts a frequency profile.

FIG. 7 depicts a further example embodiment of the present invention that provides for modifying oscillator frequency w in accordance with the curve depicted for frequency over time t. The frequency is modified in accordance with one or more frequency ramps 201, 202, 203, 204 having various slopes. Let the duration of a ramp be T. One modulation method that uses the frequency profile depicted in FIG. 7 is the frequency-modulated continuous wave (FMCW) method. Because it can be easily implemented, this frequency modulation method is suitable for use in vehicles. The various slopes of ramps 201, 202, 203, 204 allow a distinction of the contributions made to the ascertained phase difference by the length of signal pathway $S^1$, $S^2$, $S^3$, $S^n$, and by a Doppler shift resulting from a moving object K.

Figure 8:
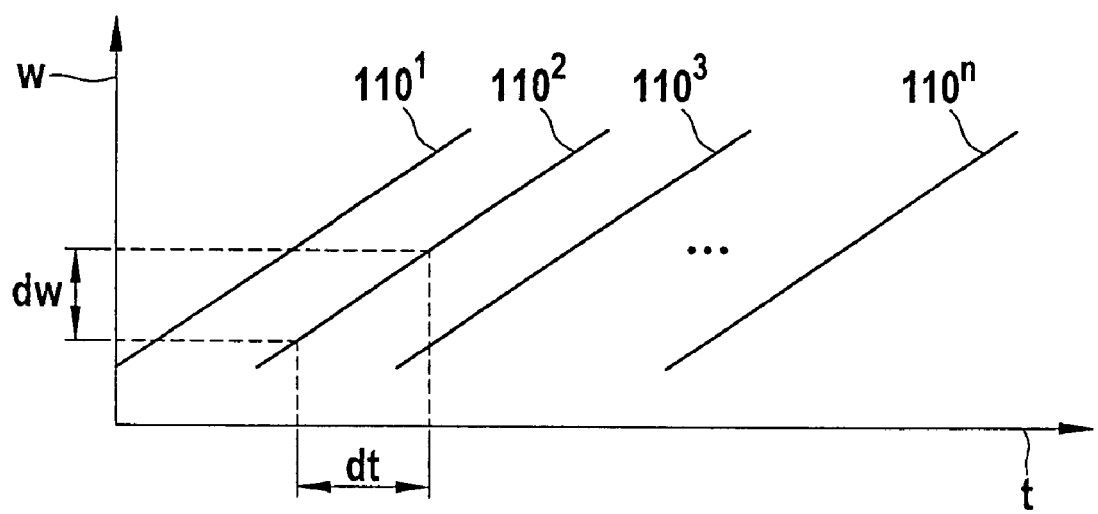
FIG. 8 schematically depicts a frequency profile of an example embodiment of the present invention.

FIG. 8 shows the profile of the oscillator frequency for the oscillator signals of the individual sensor modules $2^1$, $2^2$, $2^3$, $2^n$. The latter modify their oscillation frequency w in accordance with the frequency profile of FIG. 7, but the frequency profiles are executed with a small time offset dt from one another. All the frequencies of sensor modules 2 are thus different at any one point in time, and exhibit at a minimum a frequency difference dw. The respective phase signals determined with the dt time offset can, however, be used to evaluate the phase signals. Errors in angle determination resulting from different oscillator frequencies w are thereby eliminated. An error in angle determination results from the fact that the vehicle and/or object K moves within the time span dt, and angles $a^1$, $a^2$, $a^3$, $a^n$ and signal pathways $S^1$, $S^2$, $S^3$, $S^n$ thus correspondingly change within that time period. The time difference dt must be selected to be much shorter than the duration T of a ramp. In addition, the modulation speed in accordance with the frequency profile of FIG. 7 is so fast that the vehicle moves only slightly within one period, and the errors in angle determination thus remain very small.

What is claimed is:

1. An apparatus for determination of a direction to an object (K), comprising:
a control and signal-processing device; and
a plurality of sensor modules, each sensor module including:
a local oscillator device configured to generate a first oscillator signal,
a transmit/receive device configured to transmit a respective oscillator signal and to receive signals reflected by the object, and
a phase detection device including at least one mixer and a second local oscillator device configured to generate a second oscillator signal to be mixed into the first oscillator signal and into the received reflected signal by said at least one mixer,
wherein the phase detection device is:
coupled at one input to the oscillator device and at a second input to the transmit/receive device,
configured to determine a phase difference between the first oscillator signal and the received reflected signal, and
connected at one output to the control and signal-processing device;
the sensor modules disposed with respect to one another at spacings in a range of half a wavelength to five times a wavelength of the oscillator signal;
wherein the control and signal-processing device is configured to determine, based on the spacings and differences of the phase differences, a direction of the object with respect to the sensor modules.

2. The apparatus according to claim 1, further comprising a collimation device including at least one of a lens and (b) a dielectric polyrod disposed in a radiation direction of at least one of the sensor modules:

3. The apparatus according to claim 1, further comprising a quasi-optical filter disposed in a radiation direction of at least one of the sensor modules.

4. The apparatus according to claim 1, wherein the phase detection device includes a mixer configured to demix the received reflected signal.

5. The apparatus according to claim 1, wherein the phase detection device is arranged such that the phase difference is determinable by direct sampling of the received reflected signal.

6. The apparatus according to claim 1, wherein the oscillator devices of at least two sensor modules are not synchronized with one another.

7. The apparatus according to claim 1, further comprising a synchronization device configured to synchronize the oscillator devices.

8. The apparatus according to claim 7, wherein the oscillator devices include a phase-lock loop.

9. The apparatus according to claim 1, wherein the sensor modules are disposed at least one of (a) along a line and (b) in planar fashion.

10. A method for a determination of a direction to an object, comprising:
transmitting a first oscillator signal from at least one of transmit/receive module of sensor modules;
receiving by the transmit/receive modules, from a direction, signals reflected at the object;
determining a phase difference between the oscillator signal and the received reflected signal for at least two of the sensor modules by a phase detection device including at least one mixer and a local oscillator device configured to generate a second oscillator signal to be mixed into the first oscillator signal and into the received reflected signal by said at least one mixer,
determining, by a control and signal-processing device, the direction, based on spacings of the sensor modules with respect to one another and the ascertained phase differences.

11. The method according to claim 10, wherein a filter characteristic of a filter device of a phase detection device is adjusted by at least one of the sensor modules such that the phase detection device only determines phase signals that are based on signals transmitted by the sensor module.

12. The method according to claim 10, wherein the method is performed according to the device recited in claim 1.

13. An apparatus for determination of a direction to an object (K), comprising:
a control and signal-processing device;
a first sensor module including a local oscillator device configured to generate a first oscillator signal, a transmit device configured to transmit the oscillator signal; and
a plurality of additional sensor modules;
wherein each of the sensor modules includes:
a receive device configured to receive signals reflected by the object, and
a phase detection device including at least one mixer and a second local oscillator device configured to generate a second oscillator signal to be mixed into the first oscillator signal and into the received reflected signal by said at least one mixed
wherein the phase detection device is:
coupled at one input to the first oscillator device and at a second input to the receive device,
configured to determine a phase difference between the first oscillator signal and the received reflected signal, and
coupled at one output to the control and signal-processing device
the sensor modules disposed with respect to one another at spacings in a range of half a wavelength to five times a wavelength of the oscillator signal, and
wherein the control and signal-processing device is configured to determine, based on the spacings and differences of the phase differences, a direction of the object with respect to the sensor modules.

14. The apparatus of claim 13, further comprising:
a second sensor module including a local oscillator device configured to generate a second oscillator signal, different from the oscillator signal of the first sensor; and
a transmit device configured to transmit the second oscillator signal.

* * * * *